United States Patent
Sakashita et al.

(10) Patent No.: US 9,916,526 B2
(45) Date of Patent: Mar. 13, 2018

(54) IMAGE FORMING APPARATUS CAPABLE OF GENERATING A HANDWRITTEN DOCUMENT SPECIFIC TO A USER

(71) Applicant: KYOCERA Document Solutions Inc., Osaka (JP)

(72) Inventors: Fumiya Sakashita, Osaka (JP); Ryo Shiomi, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 15/166,052

(22) Filed: May 26, 2016

(65) Prior Publication Data

US 2016/0350632 A1   Dec. 1, 2016

(30) Foreign Application Priority Data

May 29, 2015   (JP) .................. 2015-109686

(51) Int. Cl.
*G06K 15/02*   (2006.01)
*G06K 9/00*   (2006.01)

(52) U.S. Cl.
CPC ..... *G06K 15/1827* (2013.01); *G06K 9/00456* (2013.01); *G06K 15/1802* (2013.01); *G06K 15/1836* (2013.01); *G06K 2209/01* (2013.01); *G06K 2209/011* (2013.01)

(58) Field of Classification Search
None
See application file for complete search history.

(56) References Cited

U.S. PATENT DOCUMENTS

2008/0256105 A1* 10/2008 Nogawa .................. G06F 21/64

FOREIGN PATENT DOCUMENTS

| JP | 10027217 A | * | 1/1998 |
| JP | H10-027217 | | 1/1998 |
| JP | 2005-190199 | | 7/2005 |
| JP | 2005190199 A | * | 7/2005 |

* cited by examiner

*Primary Examiner* — Andrew H Lam

(57) ABSTRACT

An image forming apparatus includes an image generating unit and a printing device. The image generating unit is configured to generate a document image based on document data of a user. The printing device is configured to print the document image. If a character appears plural times in the document data, the image generating unit converts the character that appears plural times to respective user-specific handwritten characters that are different from each other.

4 Claims, 4 Drawing Sheets

IMAGE FORMING APPARATUS CAPABLE OF GENERATING A HANDWRITTEN DOCUMENT SPECIFIC TO A USER

CROSS-REFERENCE TO RELATED APPLICATIONS

This application relates to and claims priority rights from Japanese Patent Applications No. 2015-109686, filed on May 29, 2015, the entire disclosures of which are hereby incorporated by reference herein.

BACKGROUND

1. Field of the Present Disclosure

The present disclosure relates to an image forming apparatus.

2. Description of the Related Art

Recently, a handwritten style font as a ready-made font is available. However, a handwritten style font is not a font obtained by replicating individual user's handwriting.

Meanwhile, an apparatus registers a user's handwritten character as a font in a dictionary, and afterward can generate a handwritten document of the user using the registered font.

Further, another apparatus determines similarities between an input character pattern and fonts in plural sets of font data.

Even if a usual handwritten document includes same characters, the same characters do not have a completely same character style every time due to handwriting and have somewhat different character styles. Although the aforementioned technique can generate a handwritten document of the user from document data generated by word processor software, a handwritten document generated by the aforementioned technique is contrived because only one handwritten character style is used for same characters in the document.

SUMMARY

An image forming apparatus according to an aspect of the present disclosure includes an image generating unit and a printing device. The image generating unit is configured to generate a document image based on document data of a user. The printing device is configured to print the document image. If a character appears plural times in the document data, the image generating unit converts the character that appears plural times to respective user-specific handwritten characters that are different from each other.

These and other objects, features and advantages of the present disclosure will become more apparent upon reading of the following detailed description along with the accompanied drawings.

DETAILED DESCRIPTION

Hereinafter, embodiments according to an aspect of the present disclose will be explained with reference to drawings.

Embodiment 1

Figure 1:
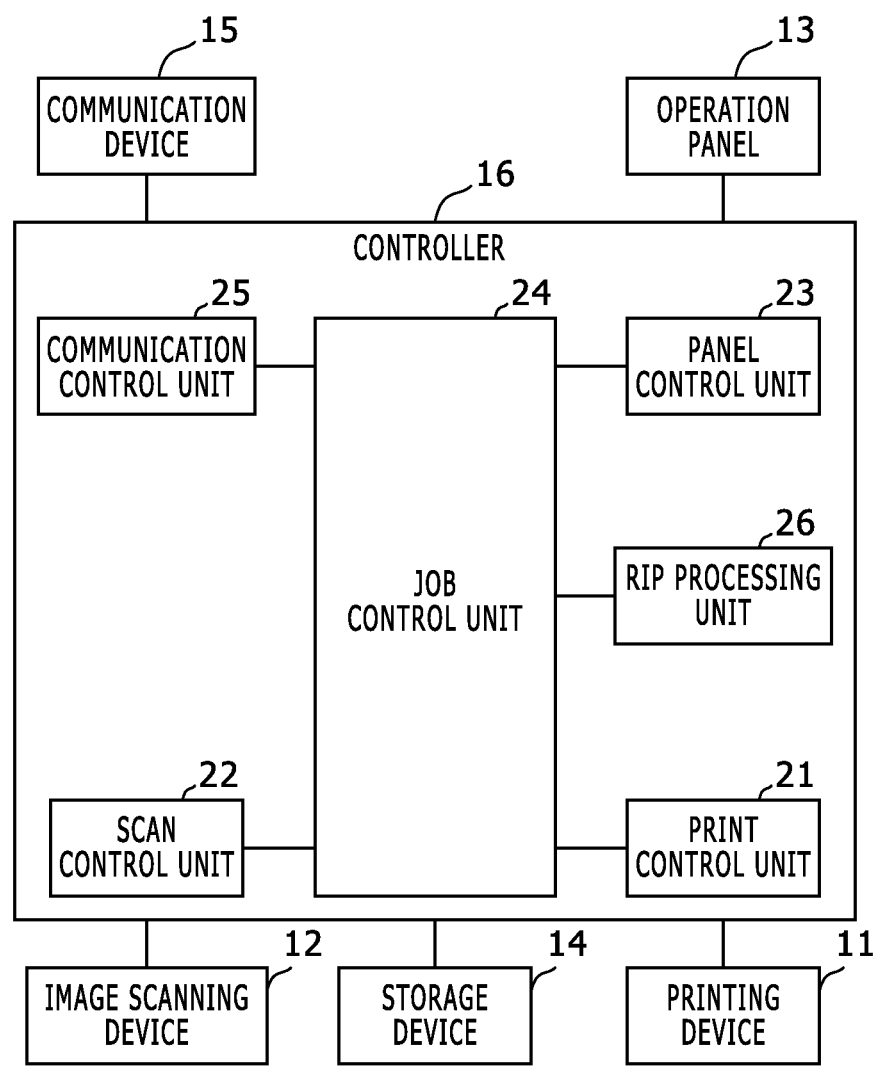
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 has a printer function. The image forming apparatus 1 shown in FIG. 1 includes a printing device 11, an image scanning device 12, an operation panel 13, a storage device 14, a communication device 15, and a controller 16.

The printing device 11 is an internal device that prints a document image of each page based on print image data on a printing paper sheet using an electrophotography method. For example, the print image data is raster image data generated from document data (e.g. PDL (Page Description Language) data) received by the communication device 15 and a communication control unit 25 mentioned below and transmitted from an unshown host device.

Further, the image scanning device 12 is an internal device that optically scans images of a document page by page, and generates image data of each page image.

Furthermore, the operation panel 13 is arranged on a surface of a housing of the image forming apparatus, and includes a display device that displays sorts of information to a user and an input device that detects a user operation. For example, a liquid crystal display is used as the display device. A key switch, a touch panel or the like is used as the input device.

Furthermore, the storage device is a non volatile storage device that stores ready-made font data and the like.

Furthermore, the communication device 15 is a circuit such as a network interface that connects to an unshown computer network and performs data communication with another device (e.g. a host device) connected to the network.

Furthermore, the controller 16 embodies sorts of processing units using a microcomputer or an ASIC (Application Specific Integrated Circuit). In this embodiment, the controller 16 embodies a print control unit 21, a scan control unit 22, a panel control unit 23, a job control unit 24, a communication control unit 25, and a RIP (Raster Image Process) processing unit 26.

The print control unit 21 causes the printing device 11 to perform printing on the basis of the print image data.

The scan control unit 22 controls the image scanning device 12, causes it to read an image of each page in a document (printed matter), and generates a raster image data of each page data. The panel control unit 23 controls the operation panel 13, causes the operation panel 13 to display sorts of information, and receives a user operation to the operation panel 13.

The job control unit 24 receives a job request received from an unshown host device via the communication device 15 and the communication control unit 25 and a job request based on a user operation to the operation panel 13, and executes a job of the received job request using the print control unit 21, the scan control unit 22, and/or the like. For example, when the job control unit 24 receives a print job request including document data, the job control unit 24 generates a raster image data based on the print job request, and causes the print control unit 21 to perform printing on the basis of the raster image data.

Further, the communication control unit 25 controls the communication device 15 and thereby receives a job request from an unshown host device and transmits a notice to the unshown host device in accordance with a predetermined communication protocol.

Further, the RIP processing unit 26 generates a document image based on user's document data. Specifically, the RIP processing unit 26 performs a rasterization process, and thereby generates raster image data for printing from the document data.

The RIP processing unit 26 analyzes the document data; and if a character appears plural times in the document data, then the RIP processing unit 26 converts the character that appears plural times to respective user-specific handwritten characters that are different from each other.

For example, regarding user-specific handwritten characters different from each other corresponding to one character, the RIP processing unit 26 may convert the character to respective ones of the user-specific handwritten characters by using the user-specific handwritten characters in turn in the order of similarities between the user-specific handwritten characters and the character expressed in a font type specified by the document data. These similarities can be derived using an existent pattern matching technique or the like.

For example, regarding user-specific handwritten characters different from each other corresponding to one character, the RIP processing unit 26 may convert the character to respective ones of the user-specific handwritten characters by using the user-specific handwritten characters in turn in the order of registration timing of the user-specific handwritten characters from newest to oldest.

Further, the RIP processing unit 26 (a) selects a font type most similar to a registered user-specific handwritten character among predetermined font types (i.e. predetermined ready-made handwritten style font types); and (b) converts the character in the document data to respective registered user-specific handwritten characters if the user-specific handwritten characters are registered corresponding to the character in the document data, and converts the character to a corresponding character expressed in the selected font type if the user-specific handwritten characters are not registered corresponding to the character in the document data.

Specifically, for example, for each font type, the RIP processing unit 26 calculates a sum of the similarities between the registered user-specific handwritten characters and corresponding characters expressed in the font type, and selects the font type of which the sum is largest.

For example, user's handwriting (i.e. a handwritten character) is detected using a digital pen or a tablet on a daily basis, and its handwritten character data (i.e. character image data, handwriting vector data or the like) is transmitted via a network to a predetermined server (e.g. a cloud server or the like), and in the server, registered as a user-specific handwritten character of this user. Further, an image of a user's handwritten document may be scanned by the image scanning device 12, and data of a handwritten character in the handwritten document may be transmitted to the server. The server stores character data of the user-specific handwritten character in a storage device, and transmits data of the registered user-specific handwritten character as a response of a transmission request.

For example, as mentioned, the user-specific handwritten character is registered as a character image; for a handwritten character of a specified user, the RIP processing unit 26 transmits a transmission request with a character image of a character (i.e. a target character) in the document data (i.e. a character image by a ready-made font specified in the document data) via the communication control unit 25 and the communication device 15 to the server; and the server selects one or plural user-specific handwritten characters as one or plural handwritten characters corresponding to the target character and transmits the selected one or plural handwritten characters as a response to the request. Regarding each one of the selected one or plural user-specific handwritten characters, the similarity to the character image transmitted with the transmission request is equal to or larger than a predetermined threshold value. Thus, the RIP processing unit obtains one or plural user-specific handwritten characters corresponding to a target character (i.e. a character of a ready-made font) in the document data.

It should be noted that the print job request includes a user ID with the document data, and the transmission request including the user ID is transmitted to the server. Further, these similarities can be derived using an existent pattern matching technique or the like. In this process, after enlarging or reducing one of a character image of the registered handwritten character and a character image transmitted with the transmission request, the similarity between the both character images is determined.

Further, the server may identify a character code of the registered user-specific handwritten character, and may associate a specific character code with the registered user-specific handwritten character. In such a case, for a handwritten character, the RIP processing unit 26 transmits a transmission request with a user ID and a character code of a character (i.e. a target character) in the document data; and the server selects one or plural user-specific handwritten characters of the received character code among the user-specific handwritten characters of the user ID received with the transmission request, and transmits the selected one or plural user-specific handwritten characters as a response to the request. In the aforementioned manner, the RIP processing unit 26 may obtain one or plural user-specific handwritten characters corresponding to a character in the document data.

This server may be arranged inside of the image forming apparatus.

Figure 2:
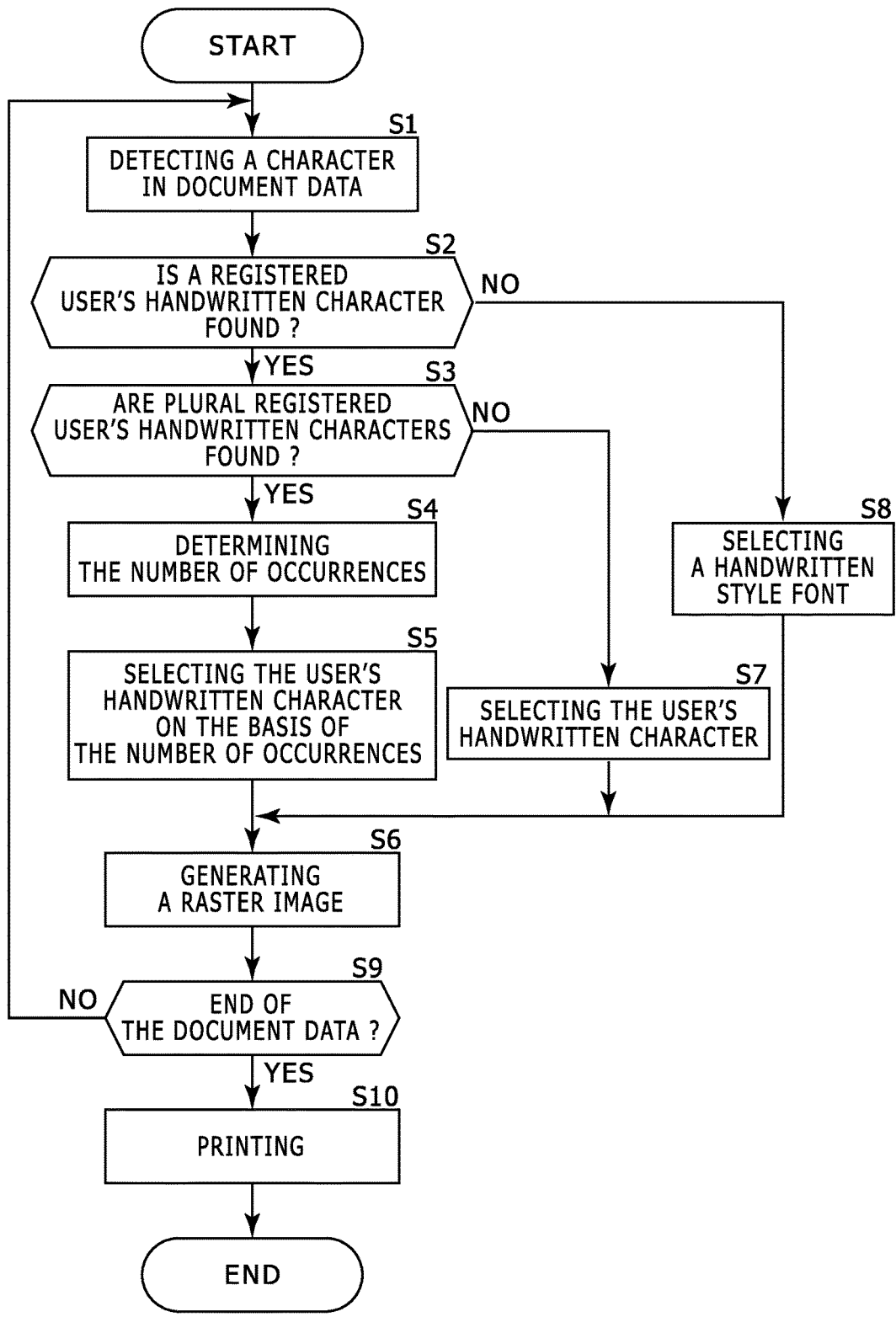
FIG. 2 shows a flowchart that explains a behavior of the image forming apparatus shown in FIG. 1.
Figure 3:
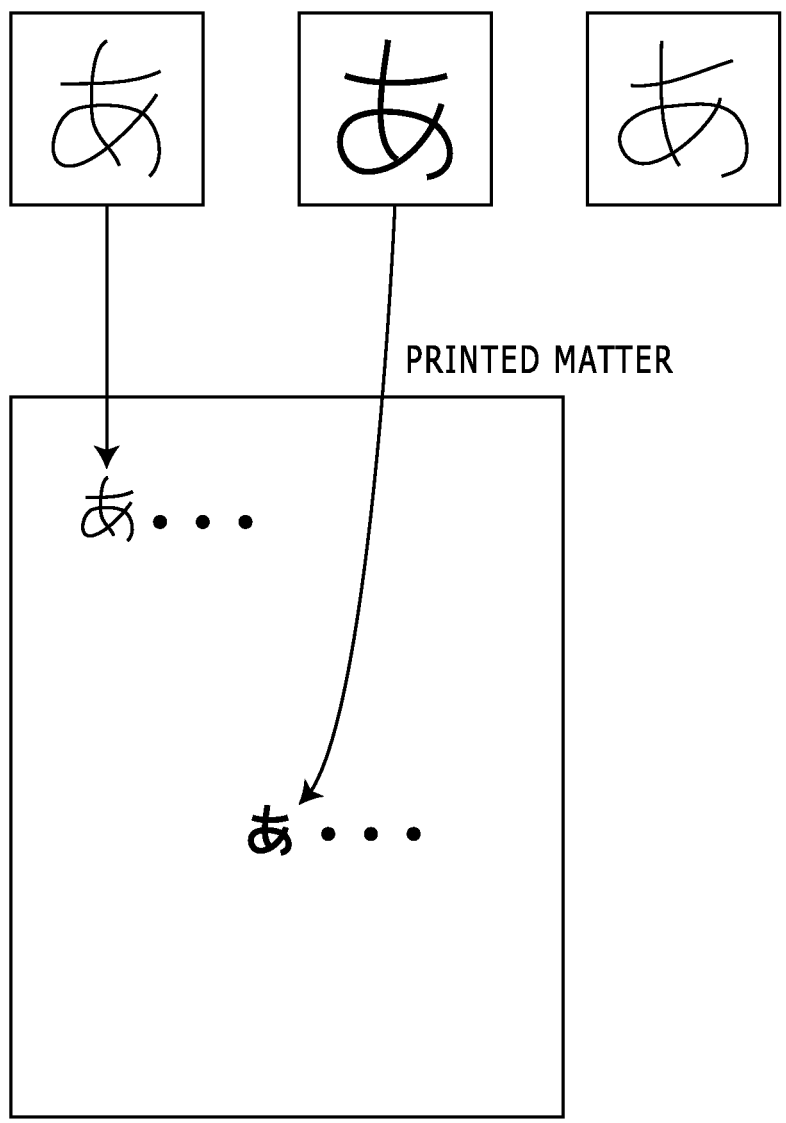
FIG. 3 shows a diagram that explains a behavior of the image forming apparatus shown in FIG. 1.

The following part explains a behavior of the aforementioned image forming apparatus. FIG. 2 shows a flowchart that explains a behavior of the image forming apparatus shown in FIG. 1. FIG. 3 shows a diagram that explains a behavior of the image forming apparatus shown in FIG. 1.

When receiving a print job request including document data using the communication control unit 25 and the communication device 15, the job control unit 24 causes the RIP processing unit 26 to perform rasterization of the document data. The print control unit 21 provides print image data obtained by the rasterization to the printing device 11, and the printing device 11 prints a document image based on the print image data.

The RIP processing unit 26 analyzes the document data from the top in turn, and when detecting a character as a target character (in Step S1), the RIP processing unit 26 transmits a transmission request for a handwritten character corresponding to the target character, receives a response to the request (e.g. here receives data of the one or more registered handwritten characters), and determines whether a user-specific handwritten character is registered corresponding to the target character or not on the basis of the response (in Step S2).

If it is determined that a user-specific handwritten character is registered corresponding to the target character, then the RIP processing unit 26 further determines whether plural user-specific handwritten characters are registered corresponding to the target character or not (in Step S3).

If it is determined that plural user-specific handwritten characters are registered corresponding to the character, then the RIP processing unit 26 counts up a counter for counting the number of occurrences of the target character and determines the current number of occurrences of the target character from the top to a currently-processed character in the document data (in Step S4), and selects a different handwritten character depending on the number of occurrences (i.e. the counter value) among the user-specific handwritten characters (in Step S5). Consequently, as shown in FIG. 3, in one document, plural user-specific handwritten characters are used in a predetermined order. FIG. 3 shows plural user-specific handwritten characters as Japanese Hiragana characters. In this order, after using the last user-specific handwritten character, the first user-specific handwritten character is used again; and thereafter in this order, the user-specific handwritten characters are repeatedly used. The RIP processing unit 26 converts the target character to a raster image of the selected handwritten character (in Step S6).

Contrarily, in Step S3, if it is determined that plural user-specific handwritten characters are not registered corresponding to the target character (i.e. that only one user-specific handwritten character is registered corresponding to the target character) then the RIP processing unit 26 selects this user-specific handwritten character (in Step S7), and converts the target character to a raster image of the selected handwritten character (in Step S6).

Contrarily, in Step S2, if it is determined that no user-specific handwritten characters are registered corresponding to the target character, then the RIP processing unit 26 selects a character style corresponding to the target character in the preselected font type (i.e. ready-made handwritten style font) (in Step S8), and converts the target character to a raster image of the selected character style (in Step S6).

Subsequently, the RIP processing unit 26 determines whether the current analyzing position reached the end of the document data or not (in Step S9); and if the current analyzing position has not reached the end of the document data yet, then returning to Step S1, the RIP processing unit 26 performs the same process in and after Step S2 for a subsequently detected character (i.e. a next target character).

Contrarily, if the current analyzing position reached the end of the document data, then the RIP processing unit terminates the rasterization process. Upon terminating the rasterization process, the job control unit 24 instructs the print control unit 21 to perform printing, and the print control unit 21 controls the printing device 11 and thereby causes it to print a document based on the raster image obtained by the rasterization (in Step S10).

As mentioned, in Embodiment 1, if a character appears plural times in the document data when generating a document image based on user's document data, the RIP processing unit converts the character that appears plural times to respective user-specific handwritten characters that are different from each other. The printing device 11 prints the document image in which the character has been converted.

Consequently, as well as a handwritten document by a user, even if a printed matter includes same characters, the same characters are expressed with handwritten characters different from each other, and therefore, a more artless handwritten document is generated for every user.

Embodiment 2

In Embodiment 2, unregistered handwritten character is generated by combining parts of respective plural registered user-specific handwritten characters.

Specifically, in Embodiment 2, if no user-specific handwritten characters are registered corresponding to a character (i.e. target character) in the document data, the RIP processing unit 26 combines parts of respective plural registered user-specific handwritten characters and thereby generates a user-specific handwritten character.

Figure 4:
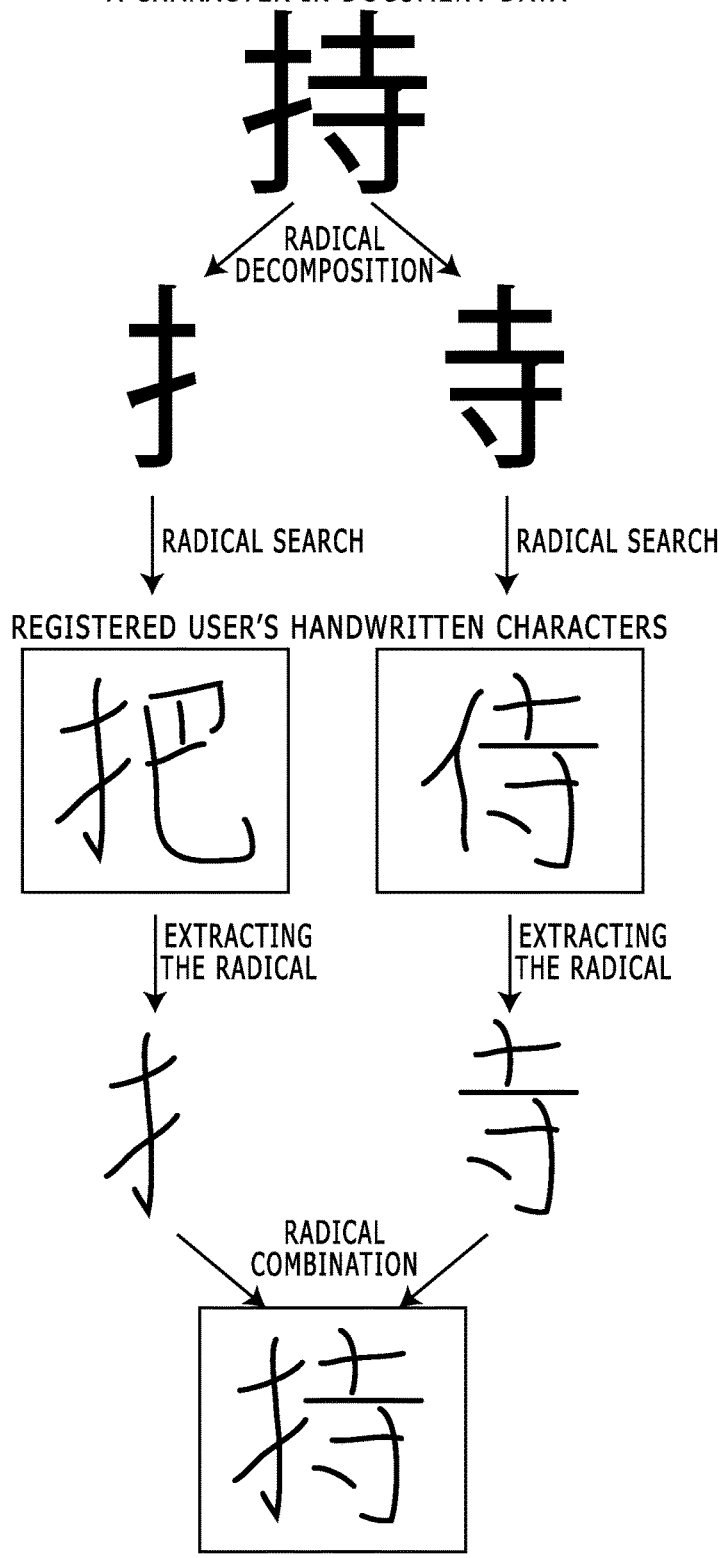
FIG. 4 shows a diagram that explains a combination of handwritten characters for generating an unregistered handwritten character in Embodiment 2.

FIG. 4 shows a diagram that explains a combination of handwritten characters for generating an unregistered handwritten character in Embodiment 2. FIG. 4 shows a combination of Chinese handwritten characters for generating a handwritten character that includes plural (here, two) radicals. For example, as shown in FIG. 4, the RIP processing unit 26 decomposes a character image of the target character in the document data into plural radical images; from a server, obtains user-specific handwritten characters that include parts similar to the respective radical images (i.e. parts that have similarities equal to or larger than a predetermined threshold value) for the respective plural radical images; and generates a handwritten character corresponding to the target character from the obtained handwritten characters.

In the aforementioned manner, the RIP processing unit automatically generates unregistered handwritten character by the combination, and converts the target character to the generated handwritten character.

Other parts of the configuration and behaviors of the image forming apparatus in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiments, regarding user-specific handwritten characters different from each other corresponding to one target character in the document data, the RIP processing unit 26 may convert the target character to respective ones of the user-specific handwritten characters by using the user-specific handwritten characters in turn in the order of priority specified to the user-specific handwritten characters by the user from highest to lowest.

Further, in the aforementioned embodiments, in a host device, a device driver that transmits the aforementioned print job request may obtain the user-specific handwritten character from the aforementioned server and may preview a document obtained by converting the character to the obtained user-specific handwritten character.

What is claimed is:

1. An image forming apparatus, comprising:
   a controller; said controller running a raster image processing unit configured to generate a document image based on document data of a user; and
   a printer configured to print the document image;
   wherein the raster image processing unit will detect a character in the document data and determine whether or not the detected character is registered as a user specific handwritten character;
   if the detected character is registered as said user specific handwritten character, the raster image processing unit will count how many different types of handwritten characters are registered and will select a different type of the registered handwritten character for each time the detected character appears in the document image; and if the detected character is not registered as said user specific handwritten character, the raster image processing unit will select a default handwritten style font type for the detected character;

wherein the printer will print the detected character using the selected type wherein the raster image processing unit will select a different type of the registered handwritten character for each time the detected character appears in the document image in turn based on an order of similarities between the user-specific handwritten characters and the detected character expressed in a font type specified by the document data.

2. An image forming apparatus, comprising:

a controller; said controller running a raster image processing unit configured to generate a document image based on document data of a user; and a printer configured to print the document image;

wherein the raster image processing unit will detect a character in the document data and determine whether or not the detected character is registered as a user specific handwritten character;

if the detected character is registered as said user specific handwritten character, the raster image processing unit will count how many different types of handwritten characters are registered and will select a different type of the registered handwritten character for each time the detected character appears in the document image; and if the detected character is not registered as said user specific handwritten character, the raster image processing unit will select a default handwritten style font type for the detected character; wherein the printer will print the detected character using the selected type wherein the raster image processing unit will select a different type of the registered handwritten character for each time the detected character appears in the document image in turn based on an order of registration timing of the user-specific handwritten characters from newest to oldest.

3. An image forming apparatus, comprising:

a controller; said controller running a raster image processing unit configured to generate a document image based on document data of a user; and a printer configured to print the document image;

wherein the raster image processing unit will detect a character in the document data and determine whether or not the detected character is registered as a user specific handwritten character;

if the detected character is registered as said user specific handwritten character, the raster image processing unit will count how many different types of handwritten characters are registered and will select a different type of the registered handwritten character for each time the detected character appears in the document image; and if the detected character is not registered as said user specific handwritten character, the raster image processing unit will select a default handwritten style font type for the detected character; wherein the printer will print the detected character using the selected type wherein if no user-specific handwritten characters are registered corresponding to the detected character, the raster image processing unit combines parts of respective plural registered user-specific handwritten characters and thereby generates a user-specific handwritten character for the detected character.

4. An image forming apparatus, comprising:

a controller; said controller running a raster image processing unit configured to generate a document image based on document data of a user; and a printer configured to print the document image;

wherein the raster image processing unit will detect a character in the document data and determine whether or not the detected character is registered as a user specific handwritten character:

if the detected character is registered as said user specific handwritten character, the raster image processing unit will count how many different types of handwritten characters are registered and will select a different type of the registered handwritten character for each time the detected character appears in the document image; and if the detected character is not registered as said user specific handwritten character, the raster image processing unit will select a default handwritten style font type for the detected character; wherein the printer will print the detected character using the selected type wherein the raster image processing unit (a) selects a font type most similar to a registered user-specific handwritten character among predetermined font types; and (b) converts the detected character to respective ones of registered user-specific handwritten characters if the user-specific handwritten characters are registered corresponding to the detected character, and converts the appearing character to a corresponding character expressed in the selected font type if the user-specific handwritten characters are not registered corresponding to the detected character.

* * * * *